(12) United States Patent
Hairston et al.

(10) Patent No.: US 11,873,939 B2
(45) Date of Patent: Jan. 16, 2024

(54) PIPE LINER END TERMINATION

(71) Applicant: INA Acquisition Corp., Chesterfield, MO (US)

(72) Inventors: Mark Hairston, Festus, MO (US); Rick Baxter, St. Louis, MO (US)

(73) Assignee: INA Acquisition Corp., Chesterfield, MO (US)

( * ) Notice: Subject to any disclaimer, the term of this patent is extended or adjusted under 35 U.S.C. 154(b) by 566 days.

(21) Appl. No.: 17/034,969

(22) Filed: Sep. 28, 2020

(65) Prior Publication Data

US 2022/0099229 A1 Mar. 31, 2022

(51) Int. Cl.
*F16L 55/165* (2006.01)
*F16L 33/22* (2006.01)
*B29C 63/34* (2006.01)

(52) U.S. Cl.
CPC .......... *F16L 55/165* (2013.01); *B29C 63/346* (2013.01); *F16L 33/222* (2013.01)

(58) Field of Classification Search
CPC ...... F16L 55/165; F16L 33/222; B29C 63/346
See application file for complete search history.

(56) References Cited

U.S. PATENT DOCUMENTS

| | | | | |
|---|---|---|---|---|
| 3,210,095 A | * | 10/1965 | Elliott | F16L 58/1027 285/55 |
| 3,889,985 A | * | 6/1975 | Gartmann | F16L 51/035 285/900 |
| 4,951,976 A | | 8/1990 | Boelkins | |
| 5,244,237 A | * | 9/1993 | Harvey | F16L 23/125 285/55 |
| 5,622,393 A | | 4/1997 | Elbich et al. | |
| 5,899,507 A | * | 5/1999 | Schroeder | E21B 17/085 285/368 |
| 8,573,655 B2 | * | 11/2013 | Carson | F16L 55/1283 285/368 |

FOREIGN PATENT DOCUMENTS

GB   1185220 A   3/1970

OTHER PUBLICATIONS

Drawing of Flange Assembly Termination (at least as early as Sep. 1, 2020).
Drawing of Steel Flange Assembly Termination (at least as early as Sep. 1, 2020).
Drawing of Plain End Termination (at least as early as Sep. 1, 2020).

* cited by examiner

*Primary Examiner* — James M Hewitt, II
(74) *Attorney, Agent, or Firm* — Stinson LLP

(57) ABSTRACT

An end termination assembly for a pipe liner includes a liner fitting and a clamping collar. The liner fitting has a nipple. The clamping collar can be disposed on the nipple to clamp the liner between the two components. A clamping surface of one or both of the nipple and clamping collar can be tapered to accommodate a range of liner wall thicknesses. The clamping collar can connect to the nipple without rotating. For example, a draw mechanism can draw the clamping collar along pipe liner to clamp the liner between collar and the nipple. The clamping collar and the nipple define an annular space in which a pipe liner can be clamped, and the radial thickness of the annular space is different at different positions of the collar.

16 Claims, 6 Drawing Sheets

PIPE LINER END TERMINATION

FIELD

The present disclosure generally relates to pipe rehabilitation. In particular, the present disclosure relates to termination of a liner used to rehabilitate pipe.

BACKGROUND

The present disclosure relates to a liner system and methods for internally lining an existing pipe with a liner. Pipe liners are installed inside an existing host pipe systems to rehabilitate defined lengths of the host pipe. When the host pipe system carries pressurized fluid, it is necessary to make a mechanical connection between the end of the liner and the existing host pipe system to restore service. A mechanical assembly known to those skilled in the art as an "end termination" is used for this purpose.

An end termination of the prior art is shown in FIG. 1 at reference number 10. Those skilled in the art will recognize that the end termination 10 is of a type that is conventionally used with close-fit pipe liners for pressure pipes. These types of liners comprise an impervious tube that can be deformed to allow for insertion into a host pipe. Once the pipe liner is in place it can be inflated in situ to create a jointless, leak free lining system able to independently carry the full system fluid pressure. A well-known example of this type of pipe liner is Thermopipe®, available from Insituform of Chesterfield, Missouri.

The end termination 10 consists of a liner fitting 12 and a clamping collar 13. The clamping collar is formed from discrete arcuate collar sections 14 connected by screws 15 (e.g., a bolt and a nut). In use, the clamping collar 13 is disposed on a pipe liner (not shown) and then the end of the pipe liner is moved over a nipple 16 of the liner fitting 12 so that the nipple is received in the end of the pipe liner. It is necessary to apply a lubricant to the nipple 16 in order to slide the pipe liner onto the nipple. The clamping collar 13 is then moved longitudinally along the liner such that it overlaps the nipple 16. The screws 15 are then tightened to clamp the liner end portion between the nipple 16 and the collar 13. As can be seen, the nipple 16 includes external annular barbs 17 and the collar 13 includes internal annular barbs 18. When the collar 13 is tightened, the internal annular barbs 18 move radially into the longitudinal spaces between the external annular barbs 17 to pinch the liner between adjacent barbs and thereby secure the end portion of the liner to the end termination 10. A coupling end of the liner fitting 12 can then be connected to the existing host pipe system using a conventional pipe coupling such as the flange-end coupling 19 shown in FIG. 1.

SUMMARY

In one aspect, an end termination assembly for a pipe liner comprises a liner fitting having an axis. The liner fitting comprises a pipe coupling configured to couple to a host pipe system and a nipple configured to be inserted into an end portion of the pipe liner. The nipple extends away from the pipe coupling in a first axial direction. The nipple has a first end portion and a second end portion spaced apart from the first end portion in a second axial direction opposite the first axial direction. The nipple comprises an annular outer wall having an outer dimension and a length extending along the axis from the first end portion of the nipple to the second end portion of the nipple. A clamping collar has a first end portion and a second end portion spaced apart from the first end portion of the clamping collar in the second axial direction. The clamping collar comprises an annular inner wall. The annular inner wall has an inner dimension and a length extending along the axis from the first end portion of the clamping collar to the second end portion of the clamping collar. The clamping collar is configured to be disposed about the nipple to clamp an end portion of the pipe liner between the annular inner wall and the annular outer wall of the nipple to fluidly couple the end termination assembly to the pipe liner. At least one of the annular inner wall of the clamping collar and the annular outer wall of the nipple tapers radially inward as it extends lengthwise in the first axial direction such that the respective one of the inner dimension and the outer dimension gradually decreases from the second end portion to the first end portion of the respective one of the clamping collar and the nipple. The clamping collar is operatively connectable to the nipple for nonrotational movement with respect to the nipple along the axis in the second axial direction for clamping the pipe liner onto the nipple.

In another aspect, an end termination assembly comprises a clamping collar configured to be disposed about the pipe liner. A liner fitting has an axis. The liner fitting comprises a pipe coupling configured to couple to a host pipe system and a nipple configured to be inserted into an end portion of the pipe liner. The nipple extends away from the pipe coupling in a first axial direction. A draw mechanism is configured to draw the clamping collar along pipe liner in a second axial direction opposite the first axial direction without rotation of the clamping collar relative to the nipple to position the clamping collar about the nipple inserted into the end portion of the pipe liner for clamping the end portion of the pipe liner between the clamping collar and the nipple to fluidly couple the end termination assembly to the pipe liner.

In another aspect, an end termination assembly compatible with a plurality of pipe liners of differing wall thicknesses comprises a liner fitting comprising a nipple having a length extending along an axis. A clamping collar is configured to be secured to the liner fitting at a plurality of different coupling positions at which the clamping collar extends circumferentially about the nipple with respect to the axis. At each of the coupling positions, the collar is disposed on the nipple in generally concentric, radially spaced apart relationship with the nipple such that the clamping collar and the nipple define an annular space in which a pipe liner can be clamped between the clamping collar and the nipple to fluidly couple the end termination assembly to the pipe liner. The annular space has a radial thickness with respect to the axis. The radial thickness of the annular space is different at each of the plurality of coupling positions.

In another aspect, a method of terminating a pipe liner to an end termination assembly comprises positioning the pipe liner in a host pipe system. A clamping collar of the end termination assembly is received onto an end portion of the pipe liner such that the clamping collar is disposed circumferentially about the pipe liner. After positioning the pipe liner and receiving the clamping collar onto the end portion of the pipe liner, a nipple of a pipe end fitting is inserted into the end portion of the pipe liner. After inserting the nipple, the clamping collar is moved along the pipe liner toward to the liner fitting substantially without rotating the clamping collar to clamp the end portion of the pipe liner between the nipple and the clamping collar.

Other aspects and features will be apparent and/or pointed out hereinafter.

BRIEF DESCRIPTION OF THE DRAWINGS

Corresponding reference characters indicate corresponding parts throughout the drawings.

DETAILED DESCRIPTION

Figure 1:
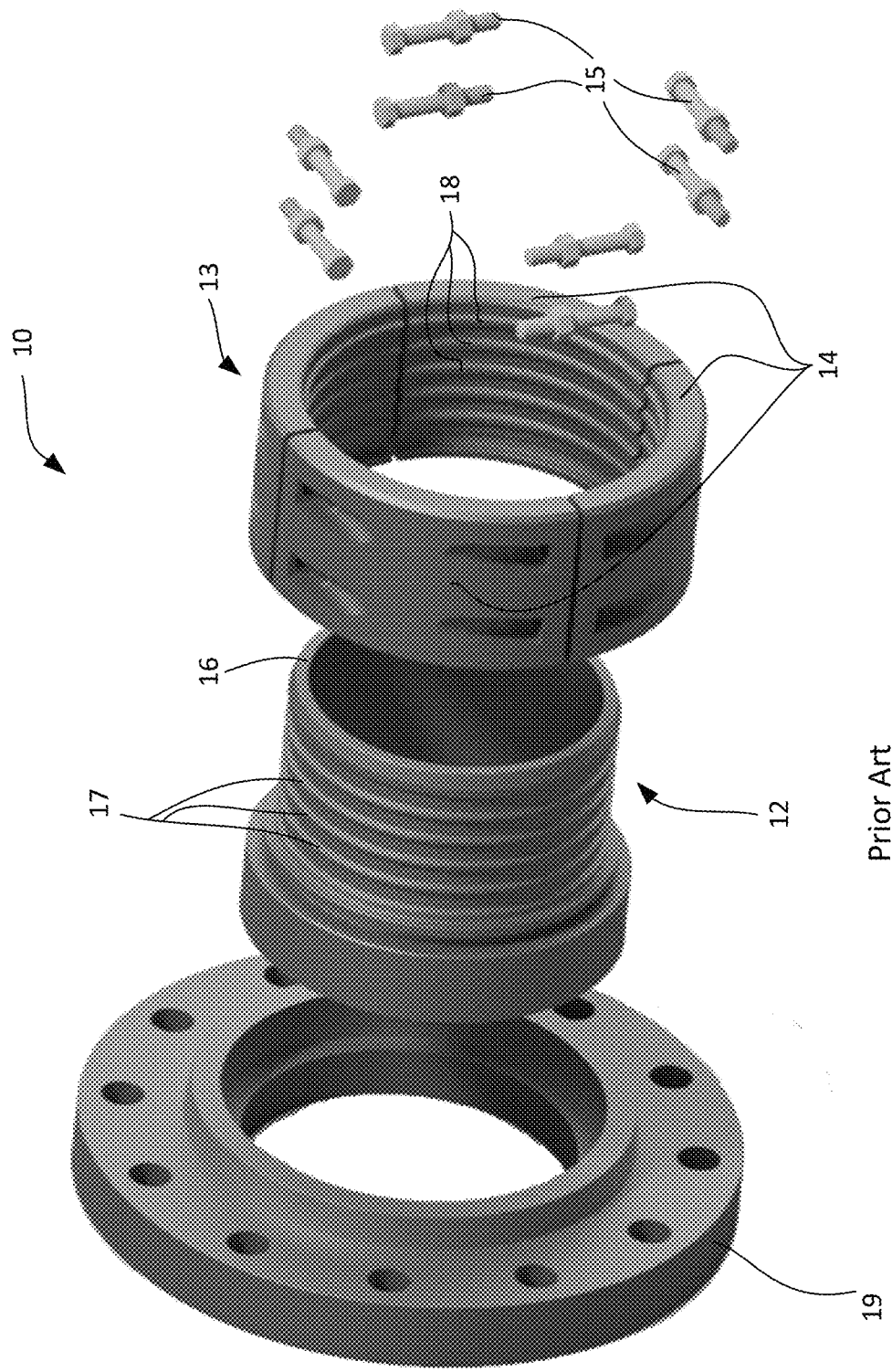
FIG. 1 is an exploded perspective of an end termination assembly of the prior art.
Figure 2:
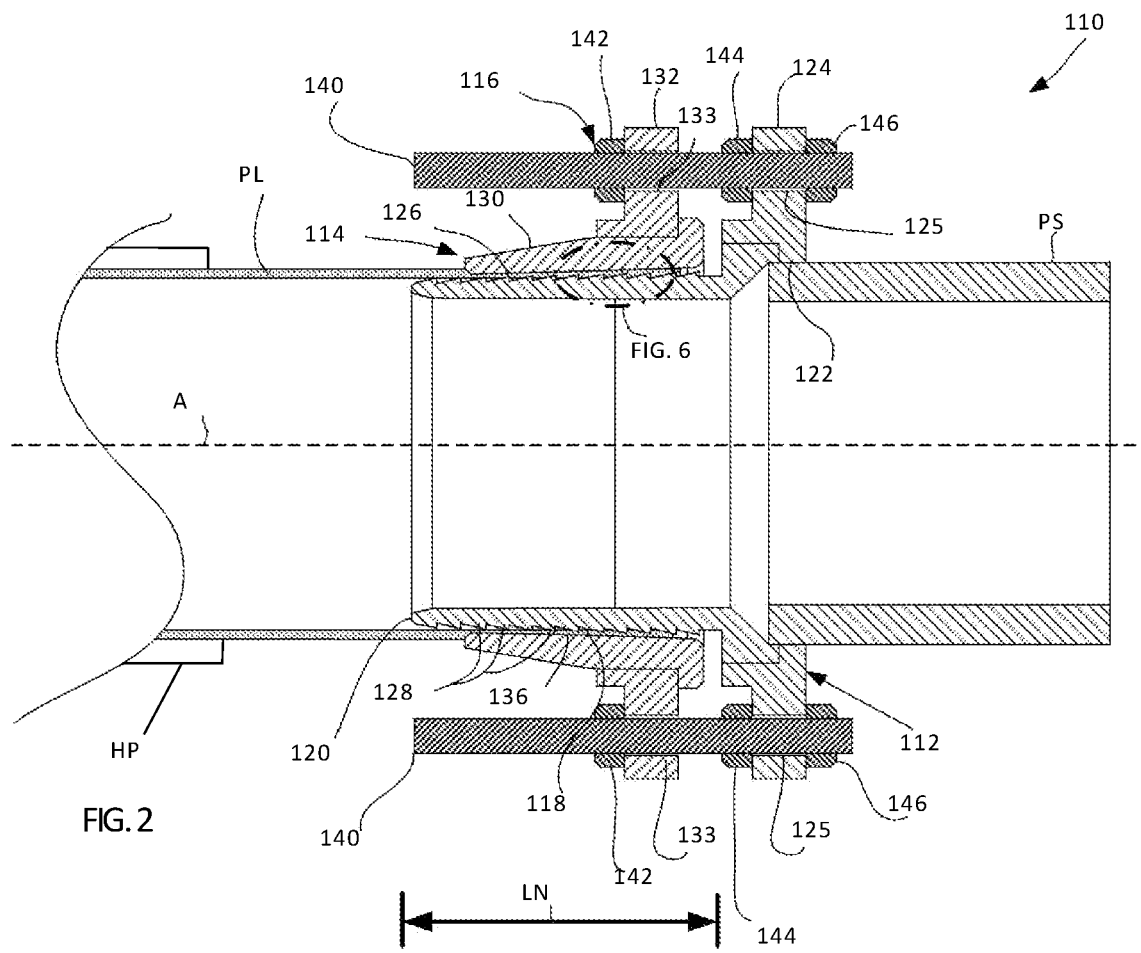
FIG. 2 is a fragmentary longitudinal section of an end termination assembly in the scope of this disclosure, showing the end termination connecting a liner to a host pipe system.
Figure 3:
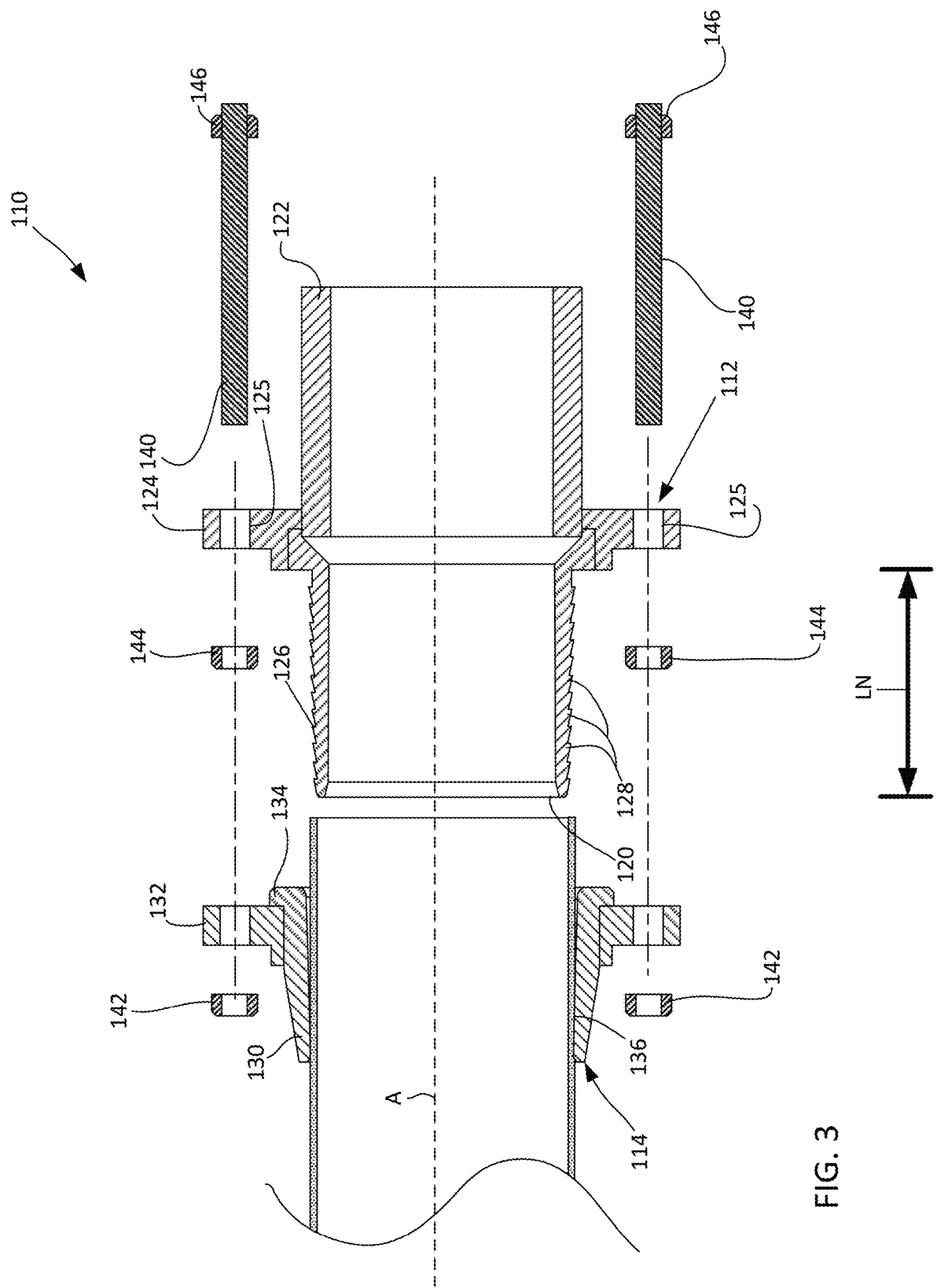
FIG. 3 is an exploded longitudinal section of the end termination assembly of FIG. 2.
Figure 4:
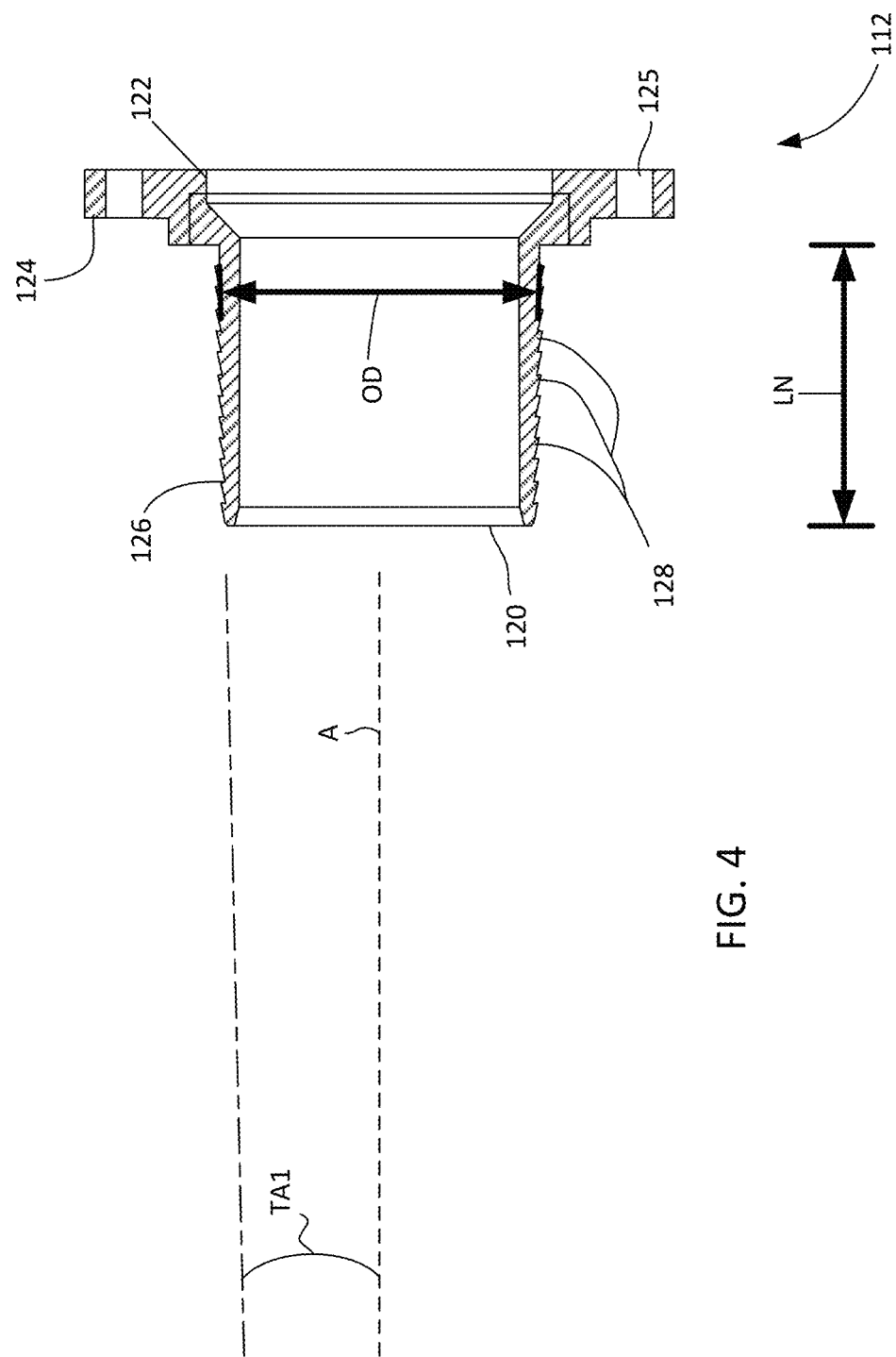
FIG. 4 is a longitudinal section of a liner fitting of the end termination assembly of FIG. 2.
Figure 5:
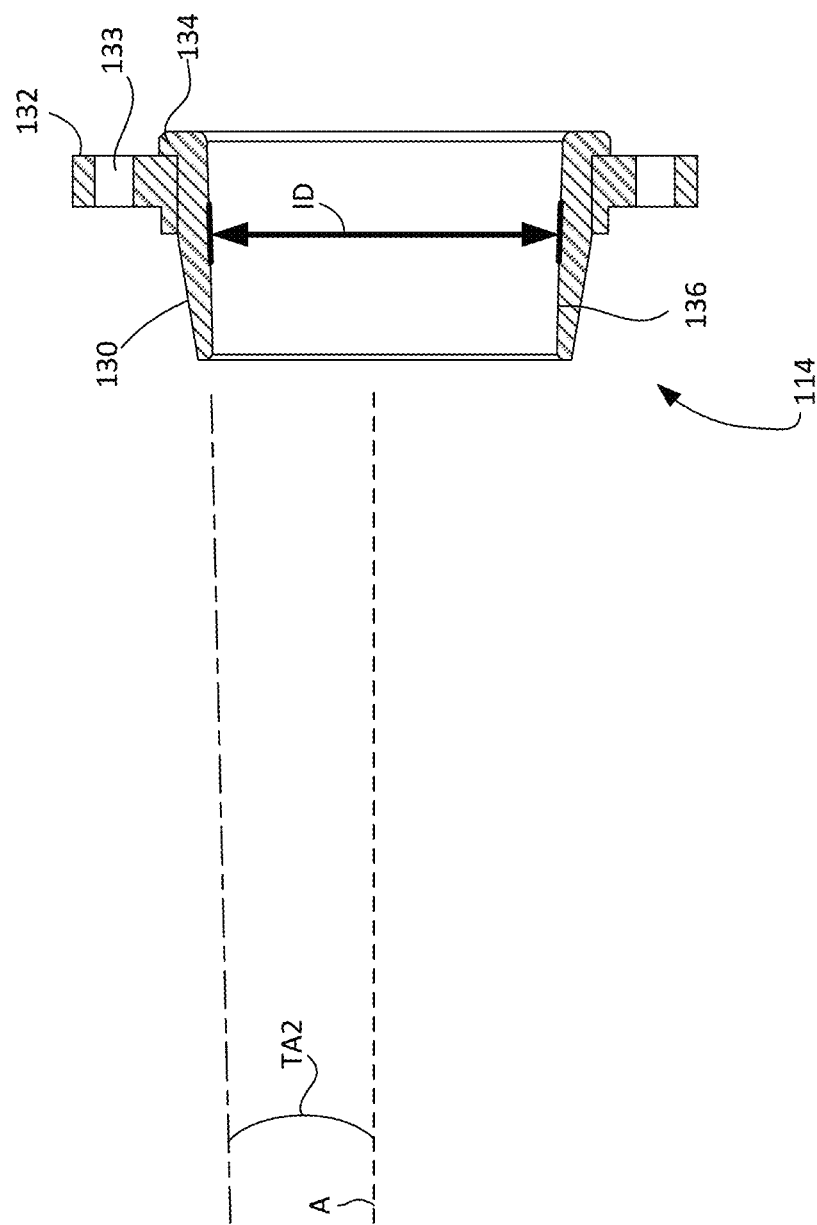
FIG. 5 is a longitudinal section of a clamping collar of the end termination assembly of FIG. 2.

The present inventors have recognized drawbacks with the prior art end termination 10 of FIG. 1. For instance, the clamping ring 13 tightens to a defined geometry that is only operative with a liner of a specific wall thickness. When the clamping ring 13 is tightened, the thickness of the gap between the clamping ring and the nipple 16 is consistent along the length of the nipple. As such, if the wall thickness of a liner is less than the specified thickness, the clamping ring 13 and the liner fitting 12 will not sufficiently compress the liner between them to make a satisfactory sealing connection. This is because the sections 14 forming the clamping ring 13 will engage each other, limiting the smallest possible internal diameter of the clamping ring. And if the wall thickness of the liner is greater than the specified thickness, it will not be possible to fit the clamping ring 13 over the thick end portion of the liner on the liner fitting. Further the fitting 10 might not make a good seal with the liner at locations where there are significant gaps between the annular sections 14 caused by an overly thick liner. Because each end termination 10 is only compatible with liners of a specific wall thickness, even for liners of the same nominal diameter, different end fittings are required for different types of liners that have different wall thicknesses.

Referring to FIGS. 2-6, an end termination assembly for a pipe liner PL that addresses these and other drawbacks of the prior art is generally indicated at reference number 110. The pipe liner PL extends PL from a host pipe HP on the left side of FIG. 2. The host pipe HP forms a part of a host pipe system. The end termination assembly 110 includes a liner fitting, generally indicated at 112, a clamping collar, generally indicated at 114, and a draw mechanism, generally indicated at 116. The liner fitting 112 includes a first end portion configured to be inserted into an end portion of the pipe liner PL and a second end portion configured to fluidly couple to an existing host pipe system PS. The first end portion of the liner fitting 112 is spaced apart from the second end portion along an axis A in a first axial direction, and the second end portion of the liner fitting is spaced apart from the first end portion in a second axial direction. In FIGS. 2-6, the first axial direction corresponds with a leftward direction in the drawings and the second axial direction corresponds with a rightward direction in the drawings. Thus the terms "left" and "right" will be used in this disclosure to connote directions and relative positions shown in the drawings. However, it will be understood that the orientation of the end termination assembly 110 will vary during use.

Figure 6:
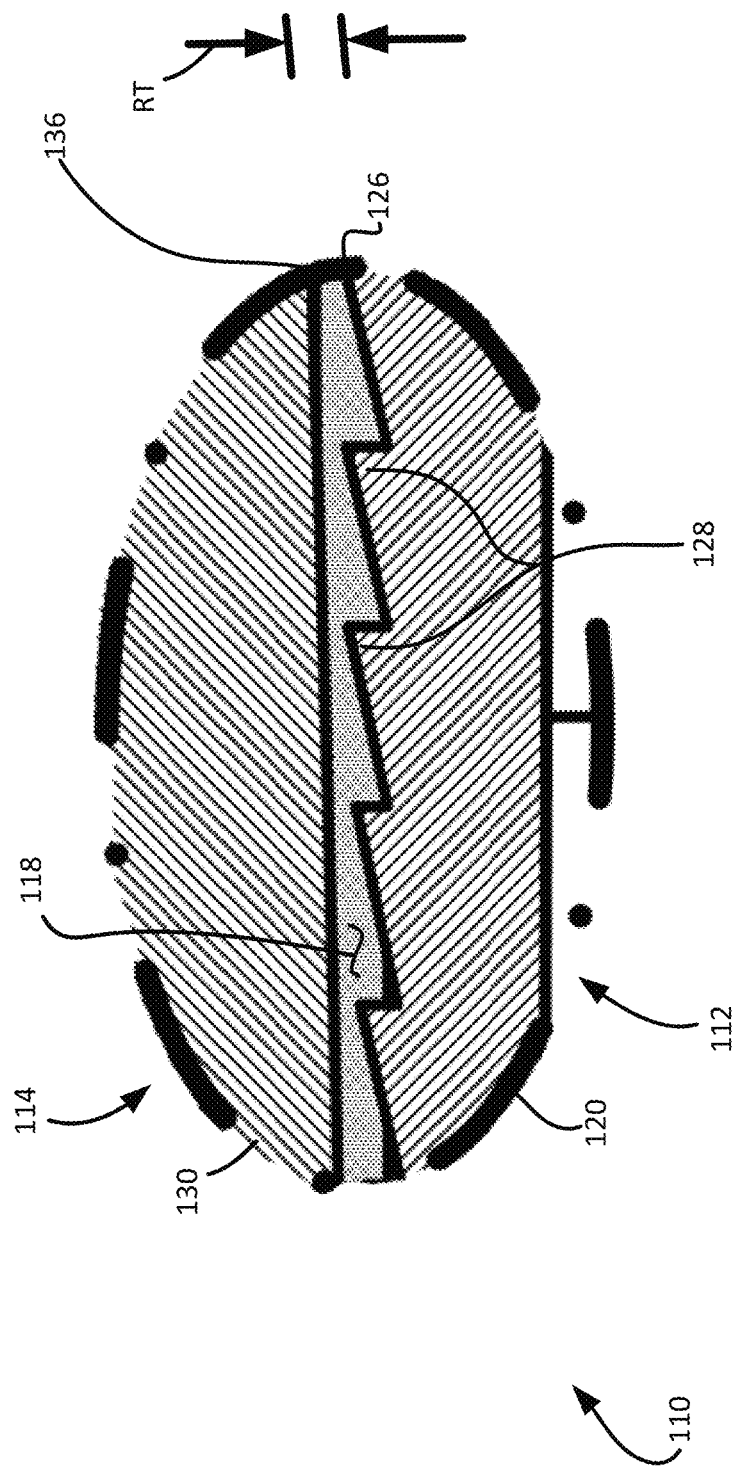
FIG. 6 is a greatly enlarged view of a portion of FIG. 2, taken as indicated in FIG. 2.

In general, the draw mechanism 116, is configured to draw the clamping collar 114 along a length of the liner fitting 112 to clamp an end portion of the pipe liner PL between the clamping collar and a nipple 120 of liner fitting to fluidly connect the end termination assembly 110 to the pipe liner. The end termination assembly 110 is constructed so that the draw mechanism 116 may secure the clamping collar 114 to the liner fitting at a plurality of spaced apart coupling positions along the length LN. As will be explained more fully below, at each of the longitudinally spaced coupling positions, an annular gap or space 118 (FIGS. 2 and 6) between the clamping collar 114 and the liner fitting 112 has a different maximum radial thickness RT (FIG. 6). This enables, the termination assembly 110 to be selectively adjusted to sealingly couple to pipe liners of different wall thicknesses.

The liner fitting 112 comprises a left end portion (broadly, a first end portion) and a right end portion (broadly, a second end portion) spaced apart along the axis A. The left end portion of the liner fitting 112 is defined in the illustrated embodiment by the nipple 120, and the right end portion of the liner fitting comprises a pipe coupling 122 configured to fluidly couple the end termination assembly 110 to the host pipe system PS. The nipple 120 is spaced apart from the pipe coupling 122 in the left axial direction (broadly, first axial direction). The nipple 120 defines the nominal diameter of pipe liner PL with which the end termination assembly 110 is compatible. Nipples of various sizes may be used depending on the pipe liner being used. It is contemplated that liner fittings in the scope of this disclosure may be construed for use with pipe liners having nominal diameters in an inclusive range of from about 4 inches to about 30 inches.

A fitting flange 124 for use with the draw mechanism 116 extends radially outward at a location spaced apart to the right of the nipple 120 along the axis A. As explained more fully below, the fitting flange 124 defines a plurality of rod openings 125 that enable the draw mechanism 116 to movably couple the clamping collar 114 to the liner fitting 112. In the illustrated embodiment, the nipple 120 and the fitting flange 124 are formed from separate pieces of material (e.g., a metal such as stainless steel) that are affixed (e.g., welded) together to form the liner fitting. In other embodiments, it is contemplated that the liner fitting could be formed in other ways, such as a from a single monolithic piece of machined or cast material.

In the illustrated embodiment, the pipe coupling 122 comprises a socket for coupling to a plain end pipe section of the host pipe system PS. In other embodiments, the pipe coupling can comprise a flange coupling to facilitate a flanged connection. In certain embodiments, the fitting flange 124 used with the draw mechanism 116 may also be used as a flange for coupling the liner fitting to the host pipe system PS. It is also contemplated that various other Victaulic couplings, flanged couplings, and mechanical couplings (e.g., Megalug-based couplings) could be used to connect the second end portion (also called a closure pipe end portion) of the coupling to the unlined section of the host pipe system (e.g., sometimes called a closure pipe).

The nipple 120 has a left end portion (broadly, a first end portion) and a right end portion (broadly, a second end portion) spaced apart from the left end portion along the axis A such that the nipple has a length LN extending from the left end portion to the right end portion. The fitting flange 124 is coupled to the nipple 120 adjacent the right end portion thereof. The nipple 120 comprises an annular outer wall 126 having an outer dimension OD (FIG. 4) that extends along the length LN of the nipple. In the illustrated embodiment, the outer wall 126 tapers radially inward as it extends to the left along the axis A such that the outer dimension OD gradually decreases from the right end portion to the left end portion of the nipple. In the illustrated embodiment, the nipple comprises a taper angle TA1 (FIG. 4) measured as the included angle between the predominant slope of a surface of the outer wall in longitudinal section and the longitudinal axis A. In one or more embodiments, the taper angle TA1 of the annular outer wall 126 is in an inclusive range of from about 1° to about 15°.

In the illustrated embodiment, the nipple 120 comprises an externally barbed tube. That is, the outer wall 126 of the nipple 120 comprises a plurality of annular barbs 128 spaced apart along the length LN of the nipple 120. Each of the barbs 128 has a maximum diameter at the right end of the barb. Because the outer annular wall 126 is tapered, the maximum diameters of the plurality of barbs 128 successively decrease along the length LN of the nipple 120 in the left axial direction.

The clamping collar 114 is generally configured to be disposed about the nipple 120 to clamp an end portion of the pipe liner PL onto the outer annular wall 126 to fluidly couple the end termination assembly 110 to the pipe liner. The clamping collar 114 has a generally annular shape extending along the axis A from a left end portion (broadly, a first end portion) to a right end portion (broadly, a second end portion). In the illustrated embodiment the clamping collar 114 comprises a collar piece 130 and a flange piece 132 connected to the collar piece to form a collar flange adjacent the right end portion of the collar. In one or more embodiments, the flange piece 132 may be affixed to the collar piece 130 by a weld or the like to form a unitary clamping collar 114. Alternatively, the flange piece 132 may be unattached to the collar piece 130 but instead may connect to the flange piece by the draw mechanism 116 pressing the flange piece against a lip 134 of the collar piece. In certain embodiments, the collar and flange may be integrally formed from a single piece of monolithic material. As explained more fully below, the collar flange 132 comprises one or more rod openings 133 that enable the draw mechanism 116 to movably connect the clamping collar 114 to the liner fitting 112.

The clamping collar 114 comprises an annular inner wall 136, which has an inner dimension ID (FIG. 5) and a length extending along the axis A from the left end portion of the clamping collar to the right end portion of the clamping collar. In the illustrated embodiment, the inner wall 136 is substantially smooth. In certain embodiments, the inner wall 136 tapers radially inward as it extends in the left axial direction such that the inner dimension ID gradually decreases from the right end portion to the left end portion of the clamping collar 114. Thus, it can be seen that in the illustrated embodiment, both the inner wall 136 of the clamping collar 114 and the outer wall 126 of the nipple 120, which opposes the inner wall during use, are tapered. However, it is contemplated that, in other embodiments, only the inner wall of the clamping collar or only the outer wall of the nipple can be tapered without departing from the scope of the disclosure.

In the illustrated embodiment, the inner wall 136 has a taper angle TA2 (FIG. 5) that is about the same as the taper angle TA1 of the outer annular wall 126. Again, the taper is angle TA2 can be measured as the included angle between the predominant slope of a surface of the inner wall 136 in longitudinal section and the axis A. In one or more embodiments, the taper angle TA2 of the annular inner wall 136 is in an inclusive range of from about 1° to about 10° (e.g., in an inclusive range of from about 1° to about 5°, such as about 3°).

The draw mechanism 116 is generally configured to draw the clamping collar 114 along the nipple 120 in the right axial direction, without rotating the clamping collar with respect to the nipple, to operatively clamp the end portion of the pipe liner L between the clamping collar and the nipple. In the illustrated embodiment, the draw mechanism 116 comprises one or more threaded rods 140. Each rod is configured to extend rightward along the axis from a left end portion (broadly, a first end portion), through one of the rod openings 133 formed in the collar flange and through a rod opening 125 of the fitting flange 124, to a right end portion (broadly, a second end portion).

Broadly, each threaded rod 140 is configured to couple to the liner fitting 112 and the clamping collar 114 via the respective rod openings 125, 133, and a draw nut 142 is configured threadably advance along the rod to engage one of the liner fitting and the clamping collar and thereby draw it toward the other. In the illustrated embodiment, each advanceable draw nut 142 engages the outboard (left) end face of the collar flange 132. However, in other embodiments, draw nuts may be advanceable along one or more of the threaded rods to engage the outboard end face of the fitting flange 124 in addition or alternatively to a draw nut engaging the collar flange.

In the illustrated embodiment, the right end portion of the threaded rod 140 is fixedly anchored to the fitting flange 124. For example, in the illustrated embodiment, a pair of anchor nuts 144, 146 is coupled to each threaded rod 140 to capture the fitting flange 124 between the anchor nuts and thereby fix the liner fitting 112 to the threaded rod. Again, it will be understood that one or more threaded rods may be anchored to clamping collar instead of the liner fitting in one or more embodiments. As can be seen, the threaded rod 140 and the nuts 142, 144, 146 of the draw mechanism 116 link the clamping collar 114 to the liner fitting 112 to substantially prevent any relative rotation between these two components. However, by threadably advancing the draw nuts 142 along the threaded rods 140, the clamping collar 114 is advanced rightward along the nipple 120 toward the liner fitting 112 without rotating.

Thus, the draw mechanism 116 enables the clamping collar to be operatively coupled to the liner fitting 112 at a plurality of longitudinally spaced coupling positions at which the clamping collar 114 is disposed about the nipple 120. At each of the longitudinally spaced coupling positions, the inner wall 136 of the clamping collar 114 and the outer wall 126 of the nipple 120 define the annular space 118 (FIGS. 2 and 6) that is suitable for receiving the end portion of pipe liner PL such that the liner may be clamped between the clamping collar and the nipple. Moreover, because one or both of the inner wall 136 and the outer wall 126 is tapered, a maximum radial thickness RT of the annular space 118 with respect to the axis A will differ at each of the longitudinally spaced coupling positions at which the draw mechanism 116 can secure the clamping collar 114 to the liner fitting 112. This enables the end termination assembly 110 to operatively clamp liners of different wall thicknesses between the same liner fitting 112 and clamping collar 114. By way of example only and not limitation, at one coupling position, the end termination assembly 110 might define an annular space 118 having a maximum radial thickness RT of about 4 mm suitable for operatively clamping a pipe liner PL having an uncompressed wall thickness of about 5 mm between the nipple 120 and the clamping collar 114; but by using the drawing mechanism 116 to draw the clamping collar 114 to the right to another coupling position, the radial thickness RT might decrease to about 3 mm, which could be suitable for operatively clamping a pipe liner PL of the same nominal diameter but an uncompressed wall thickness of about 4 mm.

In one or more embodiments, the clamping collar 114 has a leftmost coupling position (broadly, a first end coupling position) at which the radial thickness RT is a maximum radial thickness of the end termination assembly 110 and a rightmost coupling position (broadly, a second end coupling position) at which the radial thickness is a minimum radial thickness. It can be seen that the difference between the maximum radial thickness and the minimum radial thickness corresponds to the range of wall thicknesses of pipe liners that can be operatively accepted in the annular space 118.

A method of rehabilitating a host pipe system PS which uses the end termination assembly 110 will now be briefly described. Before manipulating the end termination assembly 110, the installers must position a suitable pipe liner PL within the host pipe HP. Various techniques for positioning pipe liners in sections of pipe are known to those skilled in the art and may be used within the scope of this disclosure. For example, in one or more embodiments, the pipe liner PL is pulled into the desired section of the host pipe HP. Suitably, the pipe liner may be of a type that is configured for use in pressure pipe application such as a water supply pipe, industrial pressure pipes, or a sanitary sewer force main.

After positioning the liner PL in the specified section of host pipe HP, the installers access the end portion of the liner projecting from the pipe section that is to be connected to the host pipe system PS. The installers place the clamping collar 114 over the end portion of the pipe liner PL (see, FIG. 3) before inserting the nipple 120 into the liner end portion until the nipple is fully received in the liner. Here, "fully receiving" the nipple 120 means that the nipple is moved axially into the end portion of the liner PL until the nipple presses radially outward against the entire circumference of the liner. Depending on the type of liner being used, the nipple 120 may be inserted until the end portion of the liner begins to expand or stretch circumferentially around the nipple.

Subsequently the installers insert a threaded rod 140 through each rod opening 124 in the fitting flange and install the anchor nuts 144, 146. Then the installers move the clamping collar 114 along the liner toward the liner fitting 112, rotating the collar so that the free end portions of the threaded rods 140 pass through the rod openings 133 in the collar flange 132. The installers then place each draw nut 142 on the end of each threaded rod 142 opposite the respective anchor nuts 144, 146. Finally, the installers advance the draw nuts 142 to draw the clamping flange along the length of the nipple 120 until the clamping collar reaches the appropriate coupling position for clamping the liner PL between the inner wall 136 and the outer wall 126. This fluidly connects the end termination assembly 110 to the pipe liner PL.

After fluidly connecting the pipe liner PL to the end termination assembly 110, the installers can use the appropriate techniques and fittings to fluidly connect the pipe coupling 122 to the existing host pipe system PS.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An end termination assembly for a pipe liner, the end termination assembly comprising:
   a liner fitting having an axis, the liner fitting comprising a pipe coupling configured to couple to a host pipe system and a nipple configured to be inserted into an end portion of the pipe liner, the nipple extending away from the pipe coupling in a first axial direction, the nipple having a first end and a second end spaced apart from the first end in a second axial direction opposite the first axial direction, the nipple comprising an annular outer wall having an outer dimension and a length extending along the axis from the first end of the nipple to the second end of the nipple;
   a clamping collar having a first end and a second end spaced apart from the first end of the clamping collar in the second axial direction, the clamping collar comprising an annular inner wall, the annular inner wall having an inner dimension and a length extending along the axis from the first end of the clamping collar to the second end of the clamping collar, the clamping collar being configured to be disposed about the nipple to clamp an end of the pipe liner between the annular inner wall and the annular outer wall of the nipple to fluidly couple the end termination assembly to the pipe liner, the length of the outer annular wall of the nipple being greater than the length of the annular inner wall of the clamping collar;
   at least one of the annular inner wall of the clamping collar and the annular outer wall of the nipple tapering radially inward as it extends lengthwise in the first axial direction such that the respective one of the inner dimension and the outer dimension gradually decreases from the second end to toward the first end of the respective one of the clamping collar and the nipple;
   the clamping collar being operatively connectable to the nipple for nonrotational movement with respect to the nipple along the axis in the second axial direction for clamping and sealing the pipe liner onto the nipple.

2. The end termination assembly as set forth in claim 1, wherein each of the annular inner wall of the clamping collar and the annular outer wall of the nipple tapers radially inward as it extends lengthwise in the first axial direction such that the inner dimension and the outer dimension each gradually decrease from the second end to the first end.

3. The end termination assembly as set forth in claim 2, wherein each of the annular inner wall of the clamping collar and the annular outer wall of the nipple has a respective taper angle and the taper angles of the annular inner wall of the clamping collar and the annular outer wall of the nipple are about the same.

4. The end termination assembly as set forth in claim 3, wherein the taper angles of the annular inner wall of the clamping collar and the annular outer wall of the nipple are in an inclusive range of from about 1° to about 15°.

5. The end termination assembly as set forth in claim 1, wherein the annular outer wall of the nipple tapers radially inward as it extends in the first axial direction and wherein the annular outer wall of the nipple comprises a plurality of annular barbs spaced apart along the length of the nipple.

6. The end termination assembly as set forth in claim 5, wherein each of the annular barbs has a maximum diameter and the maximum diameters of the plurality of annular barbs successively decrease along the length of the nipple in the first axial direction.

7. The end termination assembly as set forth in claim 6, wherein the annular inner wall of the clamping collar tapers radially inward as it extends in the first axial direction and the annular inner wall of the clamping collar is substantially smooth.

8. The end termination assembly as set forth in claim 1, wherein the clamping collar is formed from a single monolithic piece of material.

9. The end termination assembly as set forth in claim 1, further comprising a draw mechanism configured to draw the clamping collar along the nipple in the second axial direction without rotating the clamping collar with respect to the nipple to clamp the end portion of the pipe liner between the clamping collar and the nipple.

10. The end termination assembly as set forth in claim 9, wherein the draw mechanism comprises a threaded rod and a draw nut configured to threadably couple to the threaded rod.

11. The end termination assembly as set forth in claim 10, wherein:
 each of the liner fitting and the clamping collar comprises a rod opening,
 the threaded rod is configured to extend through the rod opening of each of the liner fitting and the clamping collar, and
 the draw nut is configured to engage one of the liner fitting and the clamping collar as the draw nut threadably advances along the threaded rod to draw the clamping collar in the second axial direction relative to the nipple.

12. The end termination assembly as set forth in claim 1, wherein the clamping collar is configured be disposed about the nipple at a plurality of coupling positions spaced apart along the length of the nipple; wherein at each of the coupling positions, the clamping collar and the nipple are configured to define an annular space for receiving the pipe liner; wherein the annular space has a radial thickness with respect to the axis; and wherein the radial thickness of the annular space is different at each of the plurality of coupling positions.

13. An end termination assembly for a pipe liner, the end termination assembly comprising:
 a clamping collar configured to be disposed about the pipe liner;
 a liner fitting having an axis, the liner fitting comprising a pipe coupling configured to couple to a host pipe system and a nipple configured to be inserted into an end portion of the pipe liner, the nipple extending away from the pipe coupling in a first axial direction, the nipple having a length in the first axial direction; and
 a draw mechanism configured to draw the clamping collar along pipe liner in a second axial direction opposite the first axial direction without rotation of the clamping collar relative to the nipple to position the clamping collar about the nipple inserted into the end portion of the pipe liner for clamping the end portion of the pipe liner between the clamping collar and the nipple to fluidly couple the end termination assembly to the pipe liner, the draw mechanism comprising a threaded rod having a length greater than the length of the nipple, first and second anchor nuts adapted to be threadably received on the threaded rod and engageable with the pipe coupling to selectively position the threaded rod with respect to the pipe coupling, and a draw nut adapted to be threadably received on the threaded rod and engageable with the clamping collar for pushing the clamping collar toward the pipe coupling.

14. The end termination assembly as set forth in claim 13, wherein:
 each of the liner fitting and the clamping collar comprises a rod opening,
 the threaded rod is configured to extend through the rod opening of each of the liner fitting and the clamping collar, and
 the draw nut is configured to engage one of the liner fitting and the clamping collar as the draw nut threadably advances along the threaded rod to draw the clamping collar in the second axial direction.

15. The end termination assembly as set forth in claim 13, wherein the clamping collar comprises a collar flange and the liner fitting comprises a fitting flange, the collar flange and the fitting flange being configured to receive the threaded rod therethrough such that the threaded rod has a first end portion protruding in the first axial direction from the collar flange and a second end portion protruding in the second axial direction from the fitting flange.

16. A terminated pipe liner to pipe connection comprising:
 a host pipe system including a first host pipe and a second host pipe;
 a pipe liner extending from the first host pipe;
 a liner fitting having an axis, the liner fitting comprising a pipe coupling coupled to the second host pipe and a nipple received in an end portion of the pipe liner, the nipple extending away from the pipe coupling in a first axial direction, the nipple having a first end portion and a second end portion spaced apart from the first end portion in a second axial direction opposite the first axial direction, the nipple comprising an annular outer wall having an outer dimension and a length extending along the axis from the first end portion of the nipple to the second end of the nipple;
 a clamping collar having a first end portion and a second end portion spaced apart from the first end portion of the clamping collar in the second axial direction, the clamping collar comprising an annular inner wall, the annular inner wall having an inner dimension and a length extending along the axis from the first end portion of the clamping collar to the second end portion of the clamping collar, the clamping collar being disposed about the nipple and clamping an end portion of the pipe liner between the annular inner wall and the annular outer wall of the nipple to fluidly couple the end portion termination assembly to the pipe liner;
 at least one of the annular inner wall of the clamping collar and the annular outer wall of the nipple tapering radially inward as it extends lengthwise in the first axial direction such that the respective one of the inner dimension and the outer dimension gradually decreases from the second end portion to the first end portion of the respective one of the clamping collar and the nipple;
 the clamping collar being connected to the nipple for nonrotational movement with respect to the nipple along the axis in the second axial direction for clamping the pipe liner onto the nipple;

the liner fitting and clamping collar being free of connection to the first host pipe except by the pipe liner.

\* \* \* \* \*